United States Patent [19]
Turney et al.

[11] Patent Number: 5,949,812
[45] Date of Patent: Sep. 7, 1999

[54] METHOD AND SYSTEM FOR CONSERVING BATTERY RESERVES IN A NAVIGATION RECEIVER BY SLOWING AND/OR STOPPING THE SYSTEM CLOCK DURING LOW DEMAND

[75] Inventors: Paul F. Turney, Santa Clara; David C. Westcott, Los Gatos, both of Calif.

[73] Assignee: Trimble Navigation Limited, Sunnyvale, Calif.

[21] Appl. No.: 08/764,480

[22] Filed: Dec. 12, 1996

[51] Int. Cl.$^6$ ................................. H04B 7/216
[52] U.S. Cl. .................... 375/200; 375/316; 370/311; 370/320; 370/342; 455/3.2; 455/427; 455/343; 455/574; 713/322; 713/324
[58] Field of Search .................... 375/200, 377, 375/316; 342/357; 395/555, 556, 750.03, 750.04, 750.06; 370/311, 320, 342; 455/3.2, 427, 543, 574; 713/322, 324

[56] References Cited

U.S. PATENT DOCUMENTS 5,592,173  1/1997  Lau et al. ................................. 342/357
5,799,198  8/1998  Fung ................................. 395/150.05
5,826,092  10/1998  Flannery ................................. 395/750.06

*Primary Examiner*—Amanda T. Le
*Attorney, Agent, or Firm*—Thomas E. Schatzel; Law Offices Of Thomas E. Schatzel, A Prof. Corp.

[57] ABSTRACT

A battery-operated navigation satellite receiver with an antenna, a radio frequency stage, a down-converter, a digital signal processor and a microcomputer for demodulating L-band microwave carrier frequency spread spectrum transmissions from orbiting navigation satellites that each use their own unique pseudo-random number spreading code. The digital signal processor and a microcomputer each receive system clocks that can be varied in steps from full-speed down to any number of fractions including zero, or full stop. The system clocks to the digital signal processor and a microcomputer are lowered during periods of little or no acquisition or navigation activity. Scheduled updates, communication traffic, user activity, etc., are used to ramp the system clocks back up when the processing load demands it, e.g., when the tasks become CPU-bound at the current clock speed or when a particular task is predetermined to need the full processing speed capability of a particular navigation receiver. The slower system clocks have a direct correspondence with lowered power consumption demands by the digital signal processor and a microcomputer.

13 Claims, 1 Drawing Sheet

METHOD AND SYSTEM FOR CONSERVING BATTERY RESERVES IN A NAVIGATION RECEIVER BY SLOWING AND/OR STOPPING THE SYSTEM CLOCK DURING LOW DEMAND

RELATED APPLICATION

The present assignee, Trimble Navigation, has a co-pending U.S. patent application by Eric B. Rodal, et al., Ser. No. 08/305,356, filed Sep. 13, 1994, now U.S. Pat. No. 5,564,098 and titled ULTRA LOW-POWER INTEGRATED CIRCUIT FOR PSEUDO BASEBAND DOWN-CONVERSION OF GPS RF SIGNALS. Such Application is relevant to the present disclosure and is incorporated herein by reference.

BACKGROUND OF THE INVENTION

1. Field of the Invention

The invention relates generally to navigation receivers and more specifically to methods and devices for extending the battery life of battery-operated handheld navigation receivers.

2. Description of the Prior Art

When a battery-operated handheld portable global positioning system (GPS) navigation receiver is first turned on, there is an avalanche of processing demands that befall the digital signal processor (DSP) and microcomputer functions within. To begin with, a satellite acquisition mode is initiated that is charged with locking onto and tracking the satellite constellation visible overhead at the time. Although all the GPS satellites are transmitting on the same frequency, the Doppler effect caused by their velocities in orbit and the imprecise nature of local oscillators creates a spectrum of uncertainty that must be searched through by trying various receiver tunings until a signal is recognized. Such carrier frequency searching requires intense use of the DSP and microcomputer, so the faster these can process, the faster an initial lock can be obtained.

Concomitant with the carrier frequency search, the GPS receiver must also search both the code space and each code's phase possibilities. The GPS satellites each transmit a unique spread spectrum pseudo-random number (PRN) code, e.g., in order to make possible their multiple access on the same carrier frequency. The Doppler effect and the uncertainty of system time for an uninitialized GPS receiver mean that the PRN codes and their code complete phases must be searched. Knowing which GPS satellites should be in the area can cut down the search time by starting with those satellites' corresponding codes. But the code and code phase search also place intense, short-term demands on the processing powers of the DSP and microcomputer.

Once the first GPS satellite is found, others in the constellation can be found more rapidly because the carrier and GPS system time uncertainties are reduced. The list of candidate satellites to attempt tracking can also be narrowed. Nevertheless, great demands are placed on the DSP and microcomputer in the GPS receiver to complete the job of acquiring enough satellites so that a navigation fix can be computed.

When three, and preferably four GPS satellites are being tracked by the GPS receiver, it can enter in a navigation mode where the position, velocity and time can be computed. The processing demands now shift toward the microcomputer, and away from the DSP.

Microcomputers and DSP's are universally run at a constant, top speed. As a rule-of-thumb, which is especially true for CMOS-type integrated circuits, the faster the clock, the more power will be consumed. Intel's new P6 processor which is reported to clock at 200+ MHz, dissipates an incredible sixty watts that is too much for ordinary forced-air heat sink systems. Earlier processors run at clock speeds only a fraction of that, and therefore use far less power.

The popular Motorola line of microcomputers is not so easy to stop to save power and then resume. Tests indicate that restarting some Motorola microprocessors requires external wakeup services and devices to reactivate the microcomputer. It would be more useful if such microcomputers had the ability to resume their computational activity on their own initiative.

Twenty years ago, RCA Digital Integrated Circuits produced the CDP-1801 CMOS microprocessor that nominally ran at one megahertz. But because it was constructed of static CMOS, the clock could be taken down to zero (DC). At zero clock, the CDP-1801 drew only a leakage current, a few nanoamperes. The CDP-1801 was therefore easy to single-step for troubleshooting. Other digital circuits and microprocessors since have limited their clock speeds with the express purpose of limiting power consumption. As is well-known, power consumption in battery-operated portable equipment is a key concern of producers and consumers alike.

GPS receivers do eventually idle along. Once the acquisition mode has been completed and the navigation mode has been entered and the position and other housekeeping chores have been finished, the processors in the typical GPS receiver have less to do. However, conventional GPS receivers maintain a constant, usually maximum clock speed that is high enough to support the most intense high-activity periods when they arise.

What is needed is a battery-operated GPS handheld receiver that has a high clock-speed when the present processing demands require it, and then drops to a much lower clock-speed or stops the clock when there is no current processing task to perform.

SUMMARY OF THE PRESENT INVENTION

It is therefore an object of the present invention to provide a battery-operated navigation receiver with an extended battery life.

It is a further object of the present invention to provide a method to extend the battery life of handheld portable navigation receivers.

Briefly, an embodiment of the present invention comprises a battery-operated navigation satellite receiver with an antenna, a radio frequency stage, a down-converter, a digital signal processor and a microcomputer for demodulating L-band microwave carrier frequency spread spectrum transmissions from orbiting navigation satellites that each use their own unique pseudo-random number spreading code. The digital signal processor and a microcomputer each receive system clocks that can be varied in steps from full-speed down to any number of fractions including zero, or full stop. The system clocks to the digital signal processor and selective parts of a microcomputer are lowered in frequency or ceased altogether during periods of little or no acquisition or navigation activity. Scheduled updates, communication traffic, user activity, etc., are used to ramp the system clocks back up when the processing load demands it, e.g., when the tasks become CPU-bound at the current clock speed or when a particular task is predetermined to need the full processing speed capability of a particular navigation receiver. The slower system clocks have a direct correspondence with lowered power consumption demands by the digital signal processor and a microcomputer.

An advantage of the present invention is that a navigation receiver is provided that can run longer on the same battery capacity.

Another advantage of the present invention is that a method for saving battery power in a satellite navigation receiver is provided.

These and other objects and advantages of the present invention will no doubt become obvious to those of ordinary skill in the art after having read the following detailed description of the preferred embodiment which is illustrated in the drawing figure.

IN THE DRAWINGS

FIG. 1 is a block diagram of a navigation satellite receiver in a first embodiment of the present invention.

DETAILED DESCRIPTION OF THE PREFERRED EMBODIMENT

Figure 1:
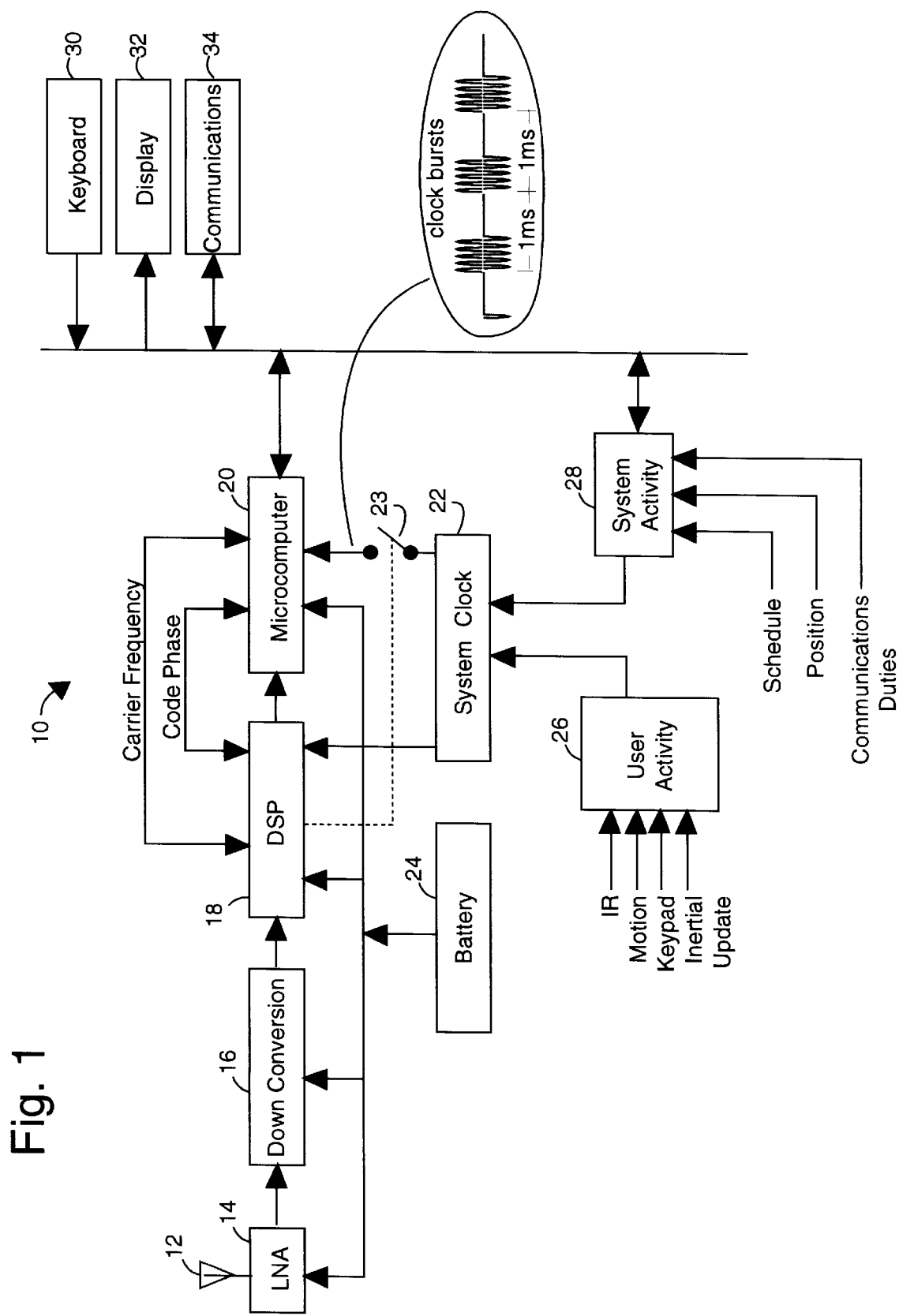

FIG. 1 illustrates a portable handheld battery-operated satellite navigation satellite receiver embodiment of the present invention, referred to by the general reference numeral 10. The receiver 10 comprises a microwave patch antenna 12 to receive L-band microwave signals broadcast by orbiting navigation satellites. A low-noise amplifier (LNA) 14 boosts these signals and applies them to a down-converter 16. In phase and quadrature phase digital samples are taken and correlated by a digital signal processor (DSP) 18. Early, punctual and late correlations are provided to a microcomputer (CPU) 20. A carrier tracking loop and a code tracking loop are managed by the CPU 20 with correction signals returned to the down-converter 16. A system clock generator 22 provides a basic reference clock to each of the DSP 18 and the CPU 20, for example a maximum frequency of 46.72 MHz is used. A switch 23 represents the periodic interruption of clocks to at least some parts of the CPU 20. A battery 24 provides operating power to the whole of the receiver 10.

The present invention includes stopping delivery of the system clock to selected parts of, a microcomputer, e.g., CPU 20, and not actually stopping all the clocks in the system or the microcomputer. Which parts of the microcomputer that are selected for clock stoppage is critical to the success of being able to transparently save power and not interfere with the user's use of the receiver. A successful restart of the microcomputer and all its clocks depends on a recognition of the right conditions or service requests. Such occurrences often need to be computed by the very microcomputer being stopped, so the clocks to parts of the microcomputer are preferably halted and resumed as necessary. The time any of the clocks are shut off depends on the time necessary to complete all the acquisition, tracking, and navigation computations that can be determined each coarse/acquisition (C/A) code epoch that repeats each millisecond on the L1-carrier frequency of a GPS satellites transmission. In other words, the microcomputer is fed its clocks in a series of bursts that vary in duration according to the current computational tasks pending, but such bursts repeat on a regular basis. Thus a variable number of clocks are delivered in each one millisecond period. This is represented in FIG. 1 by the waveform illustrated by a balloon connected to switch 23. Although the time durations that the microcomputer is effectively turned off are short, they do add up for significant power savings over hours of operation. User activity, e.g., keypad inputs, preferably cause the delivery of clocks to resume instantly, rather than wait for the next millisecond period to reactivate the microcomputer.

The clocks to the DSP associated with the microcomputer are not stopped. But further power savings can be garnered by shutting down one or more receiver channels when the number of receiver channels provided exceeds the umber of satellites being tracked.

Alternatively, during periods of low processor activity, as determined by a user activity block 26 and a system activity block 28, the system clock generator 22 is commanded to output lower system clock reference frequencies, e.g., 23.36 MHz (divide-by-two), 16 MHz (divide-by-three), etc. At one extreme, the system clock generator can be commanded to freeze, or alternatively to issue STOP commands to either the DSP 18 or the CPU 20. In the case where the system clock reference frequency is simply run down to zero DC, it is preferable in alternative embodiments of the present invention to implement the DSP 18 and the CPU 20 with full-static CMOS digital logic. In particular, SRAM-type memory is preferred over DRAM-type memory in order to support such fully-static operation.

In general, the maximum system clock frequency is provided by the system clock generator 22 whenever the CPU 20 is engaged in processing some task that is processor-bound, even at the highest clock frequencies. But eventually the CPU 20 will catch up with all its chores, e.g., responding to an input from a user keyboard 30, sending up a navigation solution to a display 32, or handling traffic from a communications device 34. During such idle times, the system clock frequency output by the system clock generator 22 is scaled back or reduced completely to zero. If a task that is running becomes processor-bound at some system clock frequency less than full speed, then a next higher step in frequency is appropriate for output by the system clock generator 22. For example, the management of a universal asynchronous receiver transmitter (UART) in the communications device 34 may require only ten percent of the full speed capability of the CPU 20. Therefore, in order to save battery power, the system activity block 28 commands the system clock generator to output a frequency one-tenth the maximum, e.g., 4.6 MHz.

Stopping the CPU 20 can be accomplished by using fully-static CMOS logic and just running the clock down to zero or by issuing a hardware STOP signal and reawakening with an INTERRUPT.

The slow-down-the-clock criterion that can be used by the system activity block 28 are the exit from satellite acquisition mode, the completion of a position fix in navigation mode, the determination of particulars for a waypoint, no activity at the keyboard 30, no incoming or outgoing messages from the communications device 34, etc. It is preferably empirically determined what clock rate each activity listed here requires for normal function. A software task scheduler is linked to the system activity block 28 to provide such information.

The speed-up-the-clock criterion that can be used by the system activity block 28 are the power-up entry into the satellite acquisition mode, the necessity of providing a position fix in navigation mode, the determination of bearing and velocity-made-good to a waypoint, activity at the keyboard 30, incoming or outgoing messages from the communications device 34, etc.

The slow-down-the-clock criterion that can be used by the user activity block 28 can include specialized input signals. For example, an infrared detector signal can be input that indicates whether a human user is anywhere nearby. For example, if the receiver 10 is placed on a table and the user is staring at it waiting for a position update, then the only sign that a user is available to consume the information produced by the receiver 10 will be the infrared signature of the user. But if there is no user around, then the receiver 10 can take its time processing even critical navigation tasks. Another specialized input signal that can be used if the clock has been set to zero is a motion sensor, not for motion around the receiver 10, but for detecting any motion of the receiver 10 itself. Such motion could be associated with the use of the receiver 10 on a moving vehicle or being carried by hand. In any case, such motion will have the effect of requiring more frequent position fixes, and thus a higher average system clock rate. Another specialized input can be inertial navigation information, e.g., bearing or velocity changes provided by a flux-gate compass and vehicle odometer. Again, the change in position or the change in velocity may require a position update sooner than a scheduled update would otherwise be indicated. It is preferable to empirically determine what clock rate each activity listed here requires for normal function.

The speed-up-the-clock criterion that can be used by the system activity block 28 are the presence of an infrared signature, the motion of the receiver 10 being detected, the step in inertial navigation, etc.

In operation, the receiver 10 receives signals from the global positioning system (GPS) in which a number of satellites in precise orbits broadcast navigational information. Every satellite in the GPS system broadcasts with the same two L-band microwave carrier frequencies. They are code division multiplexed by individual pseudo-random number (PRN) codes that identify each particular satellite. The codes comprise patterns of digital ones and zeroes that repeat over fixed time periods relative to the data rate.

In order to boost the weak signals appearing at the antenna 12 without also amplifying the noise, spread spectrum modulation techniques are used which modulates the satellite transmission by the individual satellite identification code. This has the effect of spreading the satellite signal over a bandwidth that is determined by the reciprocal of the pulse width. The receiver 10 multiplies (mixes) the signal received by a replica of the individual satellite code. Such demodulation is generally known as correlation. A particular advantage of using spread spectrum modulation is that it allows the time-of-arrival of the transmitted signals to be determined by the CPU 20. The time-of-arrival measurement is an observable that is used to calculate a "pseudorange" which is the first-cut estimate of the distance between the receiver 10 and a GPS satellite.

Determining the time-of-arrival of a signal requires recognizing at least portions of the incoming signals and then comparing their times-of-arrival with the time that they were known to have been transmitted. Such measurements are made by aligning the incoming codes and the codes using a corresponding code tracking loop. The code tracking loop adjusts the delay time of one with respect to the other, and minimizes the time difference between the incoming and local codes. Time-of-arrival measurements are then based on the current local code delay time, as measured by the local clock relative to the known time when the incoming signal was transmitted. When such delay times are multiplied by the signal propagation speed, e.g., the speed of light, the pseudorange is determined. But because the local clock is not in perfect synchronism with the transmitter clock, the pseudorange is only a rough estimate of the true range. Anything that disturbs the code tracking loop will also directly affect the time-of-arrival measurements.

Correlation receivers, like navigation receiver 10, typically demodulate the down-converted spread spectrum signal by multiplying the incoming signal with locally generated replicas of the spread spectrum code. In order to produce measurable signal powers when multiplying the locally generated codes with the incoming signals, the local codes and the incoming codes must be phased within one chip (clock cycle) of each other. When the code phase is within one chip, a measurable signal power will be output that increases as the phase difference of the two codes approaches zero and is called the autocorrelation function. Peak received power is thus detected when the two codes are perfectly aligned in time. The autocorrelation function manifests as a series of correlation spikes that output from matched filters correlator circuits. Optimum demodulation requires keeping the local code phases synchronous with the code phases of the received signals, e.g., to optimize determinations of the signals' times-of-arrival. The latitude, longitude, and altitude of the receiver 10 can be computed from these and the other observables.

The incoming spread spectrum signals are mixed to baseband so that quadrature signals (Q), as well as in-phase signals (I), are available at baseband to facilitate carrier tracking. The quadrature and in-phase baseband signals (Q and I) are binary phase-shift key (BPSK) modulated by the spreading code and by any lower modulation rate information that might be included in the satellite transmitted signal. The baseband signals contain the coarse/acquisition (C/A) spreading code with a clock rate of 1.023 MHz and a fifty baud navigation data bit stream.

Determining the optimum local code delay time requires minimizing some error signal based on the difference between the local code and the incoming code, or maximizing the autocorrelation function (AF). Because the received GPS signals are so weak, a differencing technique involving the use of "early-late" gates is used instead of looking for a maximum output from the autocorrelation function. The ideal, uncorrupted autocorrelation function is symmetrical around its peak, which represents the point in time where the codes are perfectly synchronized.

Typically, measurement of the degree of correlation between the incoming code and the local code is performed at three distinct points on the autocorrelation function. The punctual (P) point, where voltage output is maximized due to perfect alignment of the two codes. The early (E) point, which represents voltage output when the two codes are approaching alignment and are about one-half chip out of alignment, e.g., where the local code is advanced by one-half chip with respect to the incoming code. And, the late (L) point, which represents voltage output when the two codes are receding from alignment, e.g., where the local code is delayed by one-half chip with respect to the incoming code. Only one time offset is used to shift all three correlators synchronously. Thus, the correlator time shifts are not independent of one another.

One early-late gate method measures the autocorrelation function to set a sample voltage level, e.g., at the beginning of the I-bit time interval. The CPU 20 keeps track of successive samples. Samples that are one chip interval apart are then subtracted from one another. The later time sample, the "late" gate, is subtracted from the early time sample, the "early" gate. A control function is used to drive the local code chip time delay so that the local code is synchronized with the incoming code. As the early-late gate sampling function progresses in time, the error difference between the early and late voltages diminishes. When such difference goes to zero volts, the optimum autocorrelation function is established. The local code is thus synchronized with the incoming code.

The early-late gate method drives the error voltage to zero, measures the offset in code phase relative to a local clock, and derives an estimate of the time-of-arrival of the incoming signal. The punctual correlator output signal serves as a check on the steering provided by the early-late gate correlators, and in an interference-free environment this signal can confirm the early-late gate derived position of the peak. Nevertheless, the punctual correlator cannot provide any steering information on which way to shift the local code. With no extraneous interfering signals, this early/late gate method works well.

The baseband signals are fed to respective early, punctual, and late mixers which provide early, punctual, and late data for both the in-phase and quadrature signals to the CPU 20 for timing calculations. The information is used to generate a tracking signal to close respective code tracking loops. The performance of the code tracking determines the accuracy of the time-of-arrival measurements.

In order to conserve battery power in portable navigation receivers, the present invention dynamically stops the running of embedded microcomputers, especially those implemented with CMOS-type logic during a segment of every one millisecond epoch. The prior art has seemed to have taught away from this solution, and at least one major CMOS-type microcomputer chip manufacturer was initially unable to provide a chip that would start back up under required conditions without external help once it was shut down. Power shut down is initiated when the navigation receiver protocol stack runs out of pending tasks. The present invention therefore depends on means for recognizing when to restart the microcomputer and to start with the task at the top of, or some intermediate point in the protocol stack.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver, comprising:

a digital signal processor (DSP) connected to receive information carried by a spread spectrum signal and to provide a despread output;

a microcomputer connected to receive said despread output from the DSP and providing for the extraction of said information, and having a clock input for pacing the execution speed of internal computations, wherein the operating power consumed is a direct function of the frequency of said clock input;

a variable frequency clock generator connected to provide a system reference clock signal to said clock input of the microcomputer that is adjusted up in frequency for increasing computational workloads presented to the microcomputer by the DSP, and that is adjusted down in frequency for decreasing computational workloads presented by the DSP to the microcomputer, wherein a sower supply connected to provide said operating power to the microcomputer is conserved; and user activity means connected to the variable frequency clock generator and providing for an increase in said system reference clock signal that is limited by a maximum clock frequency when a user is detected.

2. A receiver, comprising:

a digital signal processor (DSP) connected to receive information carried by a spread spectrum signal and to provide a despread output;

a microcomputer connected to receive said despread output from the DSP and providing for the extraction of said information, and having a clock input for pacing the execution speed of internal computations, wherein the operating power consumed is a direct function of the frequency of said clock input;

a variable frequency clock generator connected to provide a system reference clock signal to said clock input of the microcomputer that is adjusted up in frequency for increasing computational workloads presented to the microcomputer by the DSP, and that is adjusted down in frequency for decreasing computational workloads presented by the DSP to the microcomputer, wherein a power supply connected to provide said operating power to the microcomputer is conserved; and user activity means connected to the variable frequency clock generator and providing for a decrease in said system reference clock signal that is limited by a minimum clock frequency when a user is not requiring an informational display that depends on computations by the microcomputer.

3. A receiver, comprising:

a digital signal processor (DSP) connected to receive information carried by a spread spectrum signal and to provide a despread output;

a microcomputer connected to receive said despread output from the DSP and providing for the extraction of said information, and having a clock input for pacing the execution speed of internal computations, wherein the operating power consumed is a direct function of the frequency of said clock input;

a variable frequency clock generator connected to provide a system reference clock signal to said clock input of the microcomputer that is adjusted up in frequency for increasing computational workloads presented to the microcomputer by the DSP, and that is adjusted down in frequency for decreasing computational workloads presented by the DSP to the microcomputer, wherein a power supply connected to provide said operating power to the microcomputer is conserved;

system activity means connected to the variable frequency clock generator and providing for an increase in a system reference clock that is limited by a maximum clock frequency when the microcomputer becomes processor-bound by a current system task, wherein said power supply is conserved by the lower power consumption that results by the average operation that does not exceed said maximum frequency; and user activity means connected to the variable frequency clock generator and providing for a decrease in said system reference clock signal that is limited by a minimum clock frequency when a user is not requiring an informational display that depends on computations by the microcomputer.

4. The receiver of claim 3, further comprising:

microcomputer stopping means connected to the variable frequency clock generator and the microcomputer for halting processing at the completion of all pending computational activity; and microcomputer resuming means connected to the variable frequency clock generator and the microcomputer for reinstating processing upon the receipt of a new computational task.

5. An improved battery-operated navigation satellite receiver comprising an antenna and low-noise amplifier for receiving L-band microwave spread spectrum transmissions from a plurality of orbiting navigation satellites, a downconverter connected to the antenna and low-noise amplifier for removing the carrier from said transmission, a digital signal processor (DSP) connected to the downconverter for removing said spread spectrum modulation from a baseband navigation signal, and a microcomputer connected to the DSP for calculating position from said baseband navigation signal and for maintaining a code tracking loop and a carrier tracking loop with said downconverter, the improvement comprising:

variable system clock generator means connected to provide a system clock reference frequency to said microcomputer that is dependent in frequency on the number and loading on the processing capacity of said microcomputer of program tasks then running; and user activity means connected to the variable system clock generator means and providing for an increase in said system reference clock limited by a maximum clock frequency when a user is detected.

6. An improved battery-operated navigation satellite receiver comprising an antenna and low-noise amplifier for receiving L-band microwave spread spectrum transmissions from a plurality of orbiting navigation satellites, a downconverter connected to the antenna and low-noise amplifier for removing the carrier from said transmission, a digital signal processor (DSP) connected to the downconverter for removing said spread spectrum modulation from a baseband navigation signal, and a microcomputer connected to the DSP for calculating position from said baseband navigation signal and for maintaining a code tracking loop and a carrier tracking loop with said downconverter, the improvement comprising:

variable system clock generator means connected to provide a system clock reference frequency to said microcomputer that is dependent in frequency on the number and loading on the processing capacity of said microcomputer of program tasks then running; and user activity means connected to the variable system clock generator means and providing for a decrease in said system reference clock limited by a minimum clock frequency to clock said microcomputer slower when a user is not in the vicinity to consume any navigation solutions.

7. An improved battery-operated navigation satellite receiver comprising an antenna and low-noise amplifier for receiving L-band microwave spread spectrum transmissions from a plurality of orbiting navigation satellites, a downconverter connected to the antenna and low-noise amplifier for removing the carrier from said transmission, a digital signal processor (DSP) connected to the downconverter for removing said spread spectrum modulation from a baseband navigation signal, and a microcomputer connected to the DSP for calculating position from said baseband navigation signal and for maintaining a code tracking loop and a carrier tracking loop with said downconverter, the improvement comprising:

variable system clock generator means connected to provide a system clock reference frequency to said microcomputer that is dependent in frequency on the number and loading on the processing capacity of said microcomputer of program tasks then running;

system activity means connected to the variable system clock generator means and providing for an increase in said system reference clock limited by a maximum clock frequency when said microcomputer becomes processor-bound by a current system task;

system activity means connected to the variable system clock generator means and providing for a decrease in said system reference clock limited by a minimum clock frequency when said microcomputer can be clocked slower for a current system task or idle process and not become processor-bound;

user activity means connected to the variable system clock generator means and providing for an increase in said system reference clock limited by a maximum clock frequency when a user is detected; and user activity means connected to the variable system clock generator means and providing for a decrease in said system reference clock limited by a minimum clock frequency to clock said microcomputer slower when a user is not in the vicinity to consume any navigation solutions;

wherein, said battery is conserved by the lower power consumption that results by operation at less than said maximum frequency.

8. The improved receiver of claim 7, further comprising:

microcomputer stopping means connected to the variable system clock generator means and said microcomputer for halting processing at the completion of all pending navigation solution activity; and microcomputer resuming means connected to the variable system clock generator means and said microcomputer for reinstating processing at the receipt of a new navigation solution task.

9. A method for saving power in a receiver for receiving spread spectrum transmissions of information, the method comprising the steps of:

extracting spread spectrum modulation from said transmissions with a digital signal processor (DSP);

outputting a signal derived from information included in said transmissions by said DSP to a microcomputer;

calculating a clock frequency that is dependent on the processing load of said microcomputer for a set of tasks then currently executing;

controlling the power consumption of said microcomputer by applying said clock frequency obtained in the step of calculating;

increasing said system reference clock provided to said microcomputer that is limited by a maximum clock frequency when a user is detected; and decreasing said system reference clock provided to said microcomputer that is limited by a minimum clock frequency to clock said microcomputer slower when a user is not in the vicinity to consume any navigation solutions.

10. A method for saving power in a receiver for receiving spread spectrum transmissions of information, the method comprising the steps of:

extracting spread spectrum modulation from said transmissions with a digital signal processor (DSP);

outputting a signal derived from information included in said transmissions by said DSP to a microcomputer;

calculating a clock frequency that is dependent on the processing load of said microcomputer for a set of tasks then currently executing;

controlling the power consumption of said microcomputer by applying said clock frequency obtained in the step of calculating;

decreasing a system reference clock provided to said microcomputer that is limited by a minimum clock frequency when said microcomputer can be clocked slower for a current system task or idle process and not become processor-bound;

increasing said system reference clock provided to said microcomputer that is limited by a maximum clock frequency when a user's need for computational solutions is detected; and decreasing said system reference clock provided to said microcomputer that is limited by a minimum clock frequency to clock said microcomputer slower when a user is not requesting computational solutions.

11. A method for saving battery power in a battery-operated navigation satellite receiver comprising an antenna and low-noise amplifier for receiving L-band microwave spread spectrum transmissions from a plurality of orbiting navigation satellites, a downconverter connected to the antenna and low-noise amplifier for removing the carrier from said transmission, a digital signal processor (DSP) connected to the downconverter for removing said spread spectrum modulation from a baseband navigation signal, and a microcomputer connected to the DSP for calculating position from said baseband navigation signal and for maintaining a code tracking loop and a carrier tracking loop with said downconverter, the method comprising the steps of:

providing a system clock reference frequency to said microcomputer that is dependent in frequency on the number and loading on the processing capacity of said microcomputer of program tasks then running;

increasing said system reference clock provided to said microcomputer that is limited by a maximum clock frequency when a user is detected; and decreasing said system reference clock provided to said microcomputer that is limited by a minimum clock frequency to clock said microcomputer slower when a user is not in the vicinity to consume any navigation solutions.

12. A method for saving battery power in a battery-operated navigation satellite receiver comprising an antenna and low-noise amplifier for receiving L-band microwave spread spectrum transmissions from a plurality of orbiting navigation satellites, a downconverter connected to the antenna and low-noise amplifier for removing the carrier from said transmission, a digital signal processor (DSP) connected to the downconverter for removing said spread spectrum modulation from a baseband navigation signal, and a microcomputer connected to the DSP for calculating position from said baseband navigation signal and for maintaining a code tracking loop and a carrier tracking loop with said downconverter, the method comprising the steps of:

providing a system clock reference frequency to said microcomputer that is dependent in frequency on the number and loading on the processing capacity of said microcomputer of program tasks then running;

increasing said system reference clock provided to said microcomputer that is limited by a maximum clock frequency when said microcomputer becomes processor-bound by a current system task;

decreasing said system reference clock provided to said microcomputer that is limited by a minimum clock frequency when said microcomputer can be clocked slower for a current system task or idle process and not become processor-bound;

increasing said system reference clock provided to said microcomputer that is limited by said maximum clock frequency when a user is detected; and decreasing said system reference clock provided to said microcomputer that is limited by said minimum clock frequency to clock said microcomputer slower when a user is not in the vicinity to consume any navigation solutions.

13. A satellite navigation receiver, comprising:

a battery providing for portable operating power;

a clock generator that provides a system reference clock signal, and connected to receive operating power from the battery;

a clock-gating switch connected to said system reference clock signal and having a gate control that provides for bursts of said system reference clock signal to be varied in duration;

a microcomputer connected to receive said bursts of said system reference clock signal from the clock-gating switch, and further providing for the management of a carrier tracking loop and a code tracking loop that track navigation satellite transmissions, and connected to receive operating power from the battery; and a digital signal processor connected to said system reference clock signal and providing for an output of early, punctual and late correlations that are derived from in-phase and quadrature phase digital samples of spread spectrum signals from said navigation satellite transmissions, and further providing a control signal to said gate control of the clock-gating switch that increases an average number of clocks to the microcomputer when increased computational loads are being presented by the DSP to the microcomputer, and connected to receive operating power from the battery;

wherein, the battery is conserved by reducing said average number of clocks to the microcomputer when decreased computational loads are being presented by the DSP to the microcomputer.

* * * * *